No. 782,105. PATENTED FEB. 7, 1905.
F. P. BURKHARDT.
WAGON TOOL.
APPLICATION FILED NOV. 9, 1903.
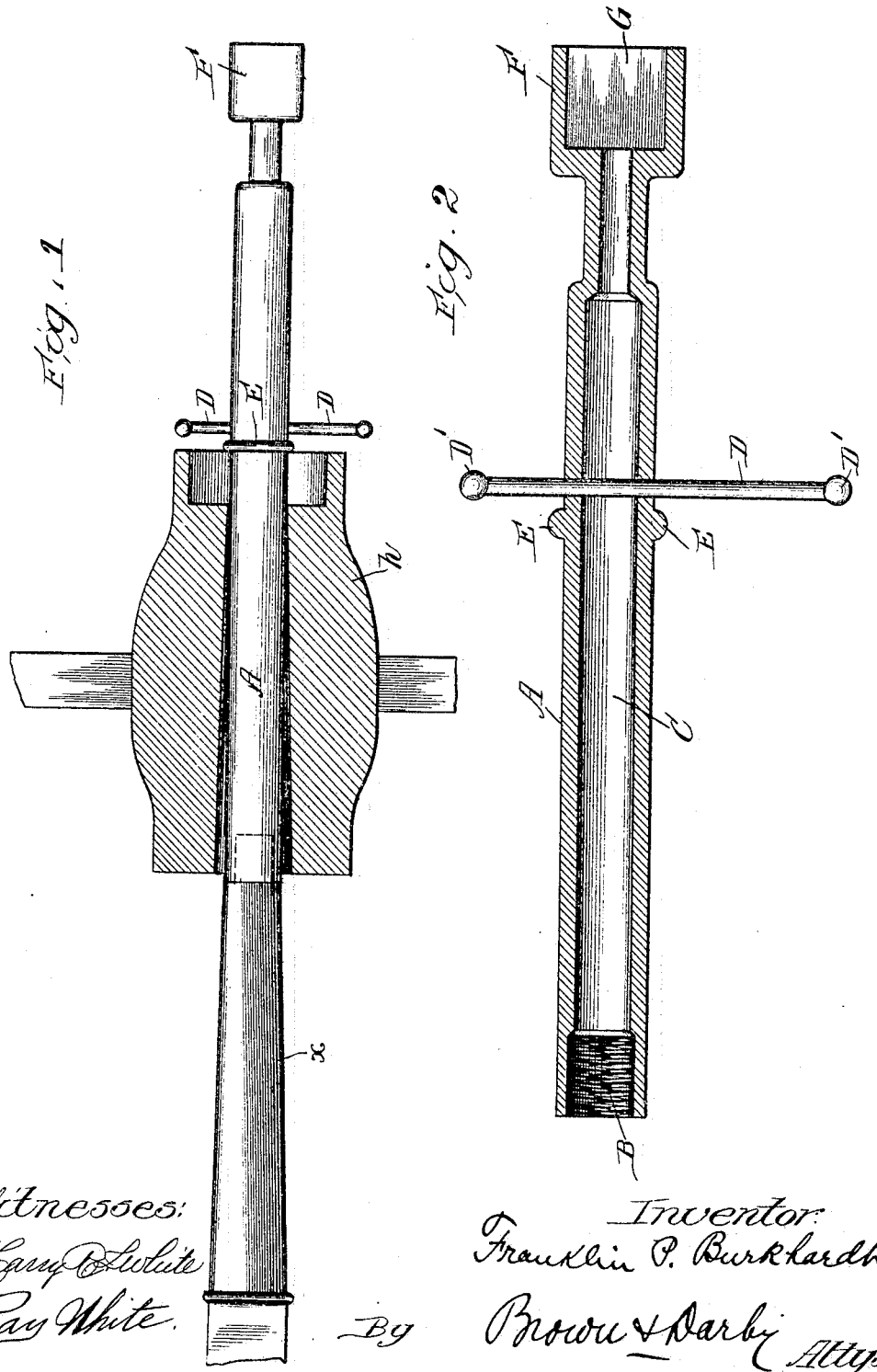
Witnesses:
Harry B. Lutute
Ray White
Inventor:
Franklin P. Burkhardt
By Brown & Darby, Attys.

No. 782,105.

Patented February 7, 1905.

UNITED STATES PATENT OFFICE.

FRANKLIN P. BURKHARDT, OF CHICAGO, ILLINOIS.

WAGON-TOOL.

SPECIFICATION forming part of Letters Patent No. 782,105, dated February 7, 1905.

Application filed November 9, 1903. Serial No. 180,339.

*To all whom it may concern:*

Be it known that I, FRANKLIN P. BURKHARDT, a citizen of the United States, residing at Chicago, in the county of Cook and State of Illinois, have invented a new and useful Wagon-Tool, of which the following is a specification.

My invention relates to an improved wagon-tool.

The object of the invention is to provide means which are simple and efficient by which the axle of a wagon or vehicle can be easily supported when the wheel is removed for the purpose of greasing or cleaning the axle.

Throughout the specification and claims it is to be understood that by the term "wagon" I mean to include any form of vehicle or conveyance which is provided with the usual form of wheels and stationary axle.

The invention consists, substantially, in the construction, combination, location, and arrangement of parts, all as will be more fully hereinafter set forth, as shown in the accompanying drawings, and finally pointed out in the appended claims.

Referring to the accompanying drawings, Figure 1 represents a device embodying the principles of my invention applied to the axle of an ordinary vehicle, the wheel-hub of the vehicle being shown in section. Fig. 2 is a view in longitudinal section of the device shown in Fig. 1.

The same part is designated by the same reference-sign wherever it occurs throughout both views.

Methods heretofore employed for cleaning or greasing the axles of wagons and the like have generally made use of lifting-jacks of various forms, by which the axle is supported when the wheel is removed and the axle exposed for the purpose desired. It is obvious that this method is inconvenient and troublesome and involves the use of a cumbersome apparatus which cannot ordinarily be carried about and is therefore not obtainable when the wagon or vehicle is away from the stable. In the use of my invention a tool is provided which can be carried about with the wagon and by which a wheel can be removed and its axle exposed without the use of a wagon-jack or any other tool.

In carrying out my invention I provide a tool having a shank or cylindrical portion A, in the end of which is a threaded socket B of a size suitable to engage a screw upon the usual stud at the end of the axle of an ordinary wagon or vehicle. It is obvious that the threads of the socket portion may be of any desired form and may be either right or left handed in order to correspond to any particular style of threads on the axle-stud; but I prefer to provide the socket B with both right and left handed threads, whereby it is adapted to engage both the right and left threaded studs which are usually provided on opposite sides of wagons and vehicles. The device may be constructed with a longitudinal hole or opening C for the purpose of reducing the weight, and a slidable pin D, having enlarged portions D' D' at each end, may be arranged to extend through a transverse opening in the body of the tool for the purpose of screwing the tool firmly upon the threaded stud of the wagon, and a beading or other form of stop E may be arranged upon the shank A in order to limit the movement of the hub of the wheel thereon.

At any convenient place upon the body of the tool, and preferably upon the end thereof opposite to the threaded socket B, I provide an enlarged portion F, having a socket G therein adapted to engage the usual nut at the end of the wagon-axle. It is obvious that the bar or pin D is adapted in addition to its above-stated function to turn the socket portion F of the tool, whereby the same is made to constitute an effective wrench for the purpose of removing the usual nut from the axle of the wagon.

Referring now particularly to Fig. 1, the operation of my improved device will be clearly understood. The socket G of the tool is first applied to the usual nut and the latter unscrewed by turning the bar D. The tool is then reversed and the threaded socket B applied to the stud on the axle of the wagon or vehicle in such a way as to form a prolongation of the same. The wheel may now be grasped and drawn outward off of the axle and onto the prolongation thereof formed by the shank A of the tool. The wagon must of course be lifted for this purpose, but only temporarily during the brief period while the wheel is being slid outward. This can easily be accomplished by the operator, who is ordinarily able to hold up the load of the axle for such momentary period. The position of the parts is now as shown in Fig. 1, in which $x$ denotes the axle of the vehicle, and $h$ the hub of the usual wheel, which has been withdrawn from the axle onto the shank A of the wagon-tool. During this time the weight of the axle is of course supported by the usual wheel through the prolongation formed by the said tool. When the operation of cleaning or greasing the axle has been completed, the wheel is slipped back and the tool removed, after which the usual nut can be restored to its place by means of the socket G, which constitutes a wrench, as above described.

From the foregoing description it will be seen that I provide an apparatus which enables the wheel of a wagon or vehicle to be removed for the purpose of greasing or cleaning the axle without the use of the usual cumbersome wagon-jack or any other apparatus other than the simple and inexpensive wagon-tool herein described, which can be carried about in the ordinary use of any wagon or vehicle.

It is obvious that my wagon-tool may be modified in many different ways. For example, the socket at the end of the shank portion A may be made in the form of a plain unthreaded cavity, which would slide over the usual threaded stud at the end of a wagon-axle and engage the same with sufficient firmness to hold up the axle in the manner above described. It is also obvious that in the case of unusually heavy wagons or vehicles where the load upon an axle was too great for the operator to lift that the usual lifting-jack could be employed in connection with my improved wagon-tool. It frequently happens in wagons and vehicles that the axles are so arranged that it is difficult to place a lifting-jack beneath them, so that it is desirable to have the axle extended by means of my wagon-tool in order to provide an engaging point for the usual jack.

Many other variations and changes in the details of construction and arrangement would readily suggest themselves to persons skilled in the art and still fall within the spirit and scope of my invention. I do not desire, therefore, to be limited or restricted to the exact details shown and described.

Having now particularly set forth the object and nature of my invention and a construction embodying the principles thereof, what I claim as new and useful and of my own invention, and desire to secure by Letters Patent, is—

1. In a wagon-tool, a shank portion having a threaded socket, and a bar extending transversely through said shank portion, whereby the latter may be turned, as and for the purpose set forth.

2. In a wagon-tool, a shank portion having a threaded socket, and a socket arranged to engage the usual nut of a wagon-axle, and a bar extending transversely through said shank portion, whereby the latter may be turned, as and for the purpose set forth.

3. In a wagon-tool, a shank portion having a threaded socket at the end thereof arranged to screw upon the usual stud at the end of a wagon-axle, and a bar extending transversely through the shank portion to serve as a handle for forcibly screwing the parts into intimate relation, said bar having enlargements at the ends thereof, as and for the purpose set forth.

4. In a wagon-tool, a shank portion formed to constitute a prolongation of the usual axle of a wagon, a threaded socket at one end of said shank portion, an additional socket formed in the other end for removing the usual axle-nut, and a bar extending transversely through the shank portion for turning the tool, as and for the purpose set forth.

5. In a wagon-tool, a cylindrical shank portion having a right and left handed threaded socket formed in one end thereof, and an additional socket formed in the other end of said shank portion and arranged to engage the usual nut at the end of a wagon and a transversely-extending bar connected to the shank portion and serving as a handle for rotating the same, as and for the purpose set forth.

6. In a wagon-tool, a shank-body portion having a central hole or opening transversely therethrough, a bar extending therethrough, a threaded socket formed in one end of the shank portion, and an additional socket formed in the opposite end thereof and arranged to engage the usual nut on the wagon-axle, as and for the purpose set forth.

In witness whereof I have hereunto set my hand, this 3d day of November, 1903, in the presence of the subscribing witnesses.

FRANKLIN P. BURKHARDT.

Witnesses:
CHAS. H. SEEM,
A. W. PROCTOR.